Patented Mar. 11, 1924.

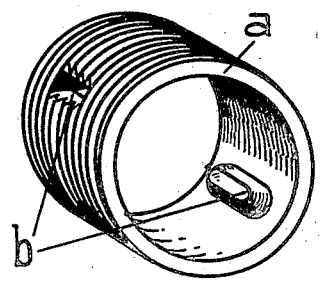
Abb. 1.
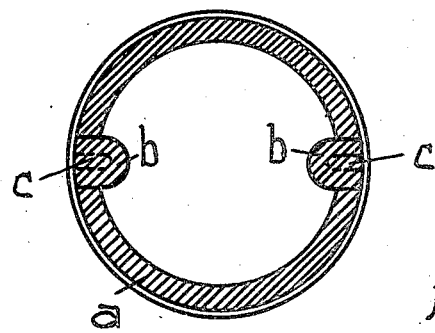
Abb. 2.

1,486,479

UNITED STATES PATENT OFFICE.

WILHELM BÖTTIGER, OF BIEBESHEIM, GERMANY.

METHOD FOR THE MANUFACTURING OF RADIATOR NIPPLES.

Application filed May 5, 1923. Serial No. 636,909.

*To all whom it may concern:*

Be it known that I, WILHELM BÖTTIGER, a citizen of the German Republic, residing at Biebesheim, Germany, have invented certain new and useful Improvements in Methods for the Manufacturing of Radiator Nipples, for which an application for patent has been filed in Germany on the 15th day of June, 1922, and of which the following is a specification.

This invention relates to radiator nipples for hot water and steam heating plants, said nipples consisting of a tubular externally threaded body which has inwardly projecting ribs designed to serve as abutments for the tool used for rotating the nipple. It is a well known fact that these nipples have to withstand a very great stress specially if they have to be removed from radiators which are dirty and rusted in or if the threads do not fit well. The radiator nipples made from malleable cast iron have proved to be quite unfit for use; so that nipples of rolled sheet iron are preferably used which are welded and fitted with continuous ribs at the rolling, said ribs forming after the rolling and welding the inner transverse bar for the wrench. Owing to the peculiarity of the welding process the ribs must be situated in the sheet in the longitudinal direction e. g. parallel to the long edge of the sheet as otherwise it would be impossible to produce perfect ribs. A consequence of this is that, after the rolling and welding of the tubular body, the fibre structure of the iron extends parallel to the central axis of the nipple. The stress to which the nipple is submitted in its longitudinal direction is not very important and in any case essentially less important than the stress which occurs in the circumferential direction, wherefrom results frequently the inconvenience that the nipples tear in the longitudinal direction and become thus useless or unreliable.

According to this invention band iron is bent to form a cylindrical body, the joints are welded together and inwardly projecting ribs, designed as abutments for the wrench or other tool, are produced by pressing whereupon the cylindrical body is externally threaded. In a tubular body which is produced in this manner from band iron or from similar material the fibre is no longer parallel to the central line of the rolled tubular body but it extends in the circumference of the body. As in this manufacturing method it is impossible to produce the ribs by rolling they must be produced in another manner.

According to the experiments, on which the invention is based, it is very simple and easy to produce ribs from unrolled band iron by pressing and this method of manufacture is much cheaper than the production of ribs in sheet iron by rolling. There is no objection to making the ribs quite uniform by filling by welding the hollow spaces which have been produced at the pressing of the ribs. This welding requires work by hand but this does not matter as at the manufacturing of the nipples from band iron the cutting off of the tubular bodies from the long tubes is no longer necessary which must be done if the nipples are made as usual from rolled sheet iron, considerable less of material resulting from this cutting off owing to the thickness of the cutting tool. This cutting off requires further much time as it can be executed only at low speed owing to the intermittent stress exerted upon the tool and upon the bench by the ribs which are placed 180° apart, subsequent milling becoming frequently necessary owing to the roughness of the cut.

An embodiment of the invention is shown by way of example on the accompanying drawing, wherein:

Fig. 1 shows the rolled and welded nipple.

Fig. 2 shows in cross section the nipple, the hollow spaces of the ribs being filled in by welding.

*a* is the tubular body which is made from a rolled piece of band iron the ends of which have been united by welding. The longitudinal fibre of the band iron extends therefore in the circumferential direction of the hollow body. Prior to the rolling and welding the ribs *b* have been pressed in the piece of band iron the outer hollow spaces of the ribs having been filled completely by a core *c*.

I claim:—

1. A method for the manufacturing of radiator nipples consisting in pressing into a piece of band iron two ribs designed to serve as abutments for the wrench, in rolling said piece of band iron to form a cylindrical body and in cutting threads into the outer surface of said cylindrical body.

2. A method for the manufacturing of radiator nipples consisting in pressing into a piece of band iron two ribs designed to serve as abutments for the wrench, in rolling said piece of band iron to form a cylindrical body, in cutting threads into the outer surface of said cylindrical body, and in filling the outer hollow spaces of said ribs by welding.

In testimony whereof I affix my signature in presence of two witnesses.

WILHELM BÖTTIGER.

Witnesses:
FRIEDRICH CARL WENTZEL,
ROBERT ADOLF HEERD.